Jan. 24, 1967   T. R. STOCKTON   3,299,726
INFINITELY VARIABLE SPEED TRANSMISSION
Filed Dec. 22, 1964
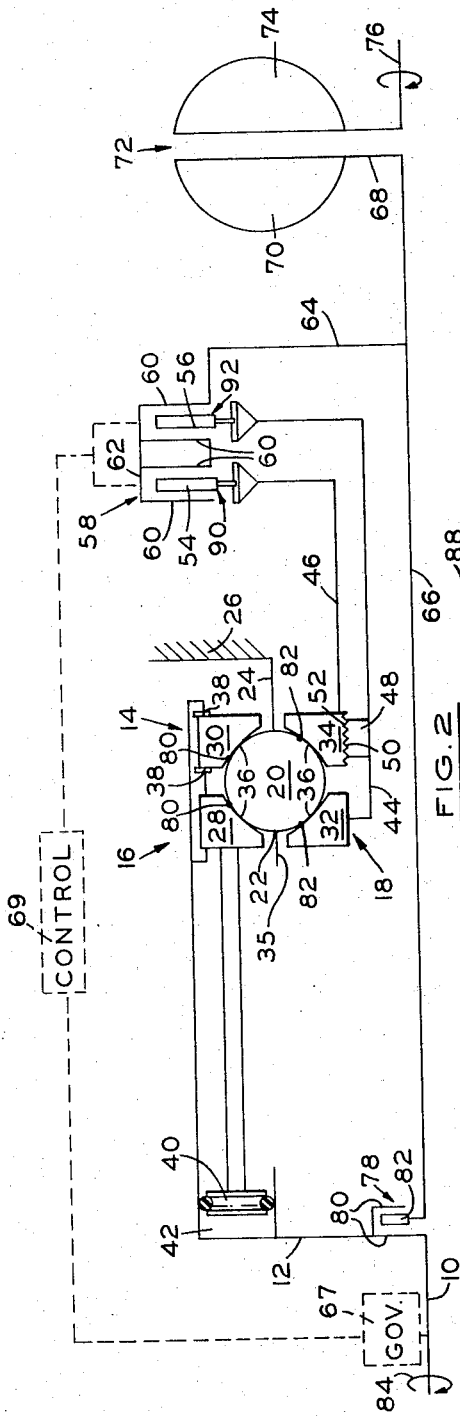
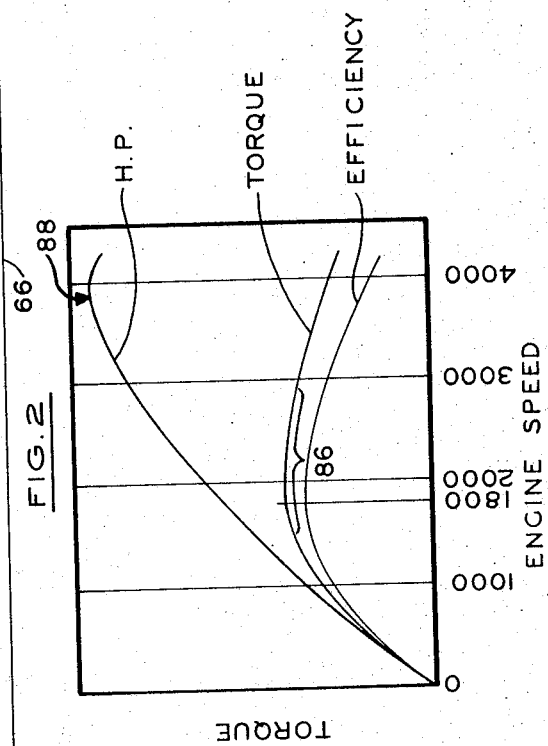
THOMAS R. STOCKTON
INVENTOR
BY John R. Faulkner
Robert E. McCollum
ATTORNEYS 3,299,726
INFINITELY VARIABLE SPEED TRANSMISSION
Thomas R. Stockton, Northville, Mich., assignor to Ford Motor Company, Dearborn, Mich., a corporation of Delaware
Filed Dec. 22, 1964, Ser. No. 420,304
6 Claims. (Cl. 74—190.5)

This invention relates to a motor vehicle transmission. More particularly, it relates to an infinitely variable speed friction drive transmission.

One of the objects of the invention is to provide a transmission that has an infinitely variable number of speed ratios, and provides infinitely smooth accelerations and decelerations of a vehicle.

Another object of the invention is to provide an infinitely variable speed friction drive transmission in which the drive ratio is changed automatically to maintain the engine operating at maximum efficiency at substantially all times.

A further object of the invention is to provide an infinitely variable speed friction drive transmission consisting of a ball friction drive unit and a fluid coupling together providing an infinite number of forward speed drives, neutral and a reverse drive, a number of slippable couplings selectively operated in response to predetermined changes in the operation of the engine automatically changing the drive ratio through the friction device in a manner to provide operation of the engine at maximum efficiency.

A still further object of the invention is to provide a ball friction drive transmission in which the inner race portions are threadedly connected so that relative rotation between the two will move them axially apart and thereby adjust the drive ratio of the friction drive; the relative rotation being controlled by a number of slippable clutches between the inner race portions and the output shaft that are responsive to changes in engine speed from given settings to adjust the engine for operation at maximum efficiency.

Other objects, features and advantages of the invention will become apparent upon reference to the succeeding, detailed description thereof, and to the drawings illustrating the preferred embodiment thereof; wherein, FIGURE 1 shows a power input shaft 10 that is adapted view of one-half of a transmission embodying the invention; and, FIGURE 2 shows graphically the variation in horsepower and engine torque with changes in engine speed.

FIGURE 1 shows a power input shaft 1 that is adapted to be connected to any suitable source of power, such as, for example, the power output shaft of an internal combustion engine. Shaft 10 is drivingly connected by an annular shell or housing member 12 to the outer annular race 14 of a ball friction drive device 16. The drive device is of a known type having an inner annular race 18 spaced from outer race 14 by a number of circumferentially spaced balls 20. The balls are floatingly mounted in pockets 22 in an annular member 24 that is fixedly secured to the transmission housing 26. The floating mount of the balls permits their radial adjustment to vary the drive ratio of the friction drive in a known manner. Each of the races has two axially spaced annular portions 28, 30 and 32, 34, each having internal concave frictional surfaces 36. The surfaces together define an annular raceway in which the balls roll.

Each of the outer race portions 28 and 30 is slidably splined to annular shell 12. Outer portion 30 is held against axial movement by snap rings 38. Race portion 28 can slide axially on its spline not only for loading the elements of the drive unit together, but also for effecting a change in the drive ratio of the ball drive unit. A number of fluid pressure operated loading pistons 40 engage race portion 28. Upon supply of fluid under pressure to the space 42 behind the pistons, the race portions 28 and 30 become loaded against ball 20 to transmit a drive in one direction from input shaft 10 to inner race 18 in the opposite direction.

Inner race portions 32 and 34 are connected to the ends of separate axially movable sleeve shafts 44 and 46, this construction permitting relative rotation between the two portions. The two portions 32 and 34 and their shafts are floatingly mounted, and threadedly connected to each other by an annular member 48. Member 48 is fixed on shaft 44 and has external threads 50 mating with internal threads 52 on inner race portion 34. In this particular case, member 48 has a right hand thread. It will be clear that relative rotation between portions 32 and 34 in either direction will cause the inner race portion 34 to move towards or away from race portion 32. This will move balls 20 upwardly or downwardly, as the case may be, to change the axial position of outer race portion 28 against the force of piston 40, and thereby change the drive ratio in a manner now to be described.

The ball drive operates in a known manner. The fixed position of race portion 30 furnishes reaction for and determines the movement of balls 20. The balls have substantially a point contact with all four portions of the inner and outer races. In the position shown, the ball drive is conditioned for a one-to-one drive ratio, since the distance from the points of contact of balls 20 with outer race portions 28 and 30 to the axis 35 of the ball is the same as the distance from the axis to the points of contact with inner race portions 32 and 34. Separating inner race portions 32 and 34 permits the loading cylinder pistons 40 to move outer race portion 28 towards race portion 30, thereby squeezing balls 20 downwardly. The points of contact of the balls with the outer race portions, therefore, also move downwardly towards the axis of the balls, while the points of contact of the balls with the inner race prtions move downwardly away from the axis of the balls.

Since the distance from the outer race contacts to the axis 35 of the balls is now less than it was, and the distance from the axis to the inner race portions is greater than it was, the peripheral velocity at the points of contact with inner race portions 32 and 34, therefore, increases the drive ratio. Moving the inner race portions together to move the ball upwardly spreads apart the outer race portions and provides a progressively increasing reduction drive through the unit.

Each of sleeve shafts 44 and 46 is splined at its opposite end to a friction disc 54 and 56. The splined connection permits the axial sliding movements of shafts 44 and 46 and, therefore, provides the floating mounting of inner race portions 32 and 34. The friction discs 54 and 56 constitute parts of a dual friction clutch pack 58. It has spaced driven friction discs 60 splined to a drum-like portion 62 of a drive flange 64. The flange is secured to a shaft 66 extending through the central portion of the transmission.

Each of the clutches of clutch pack 58 is of the slippable type. That is, the clutches can be fully engaged to transmit the torque of inner race portions 32 and 34 to the clutch driven shaft 66, or one or the other of the clutches may be slipped in a controlled manner to provide relative rotation between the inner race portions 32 and 34, and, therefore, an adjustment of the drive ratio of the ball drive mechanism 16. The selective operation of the clutches is controlled by a signal from a governor mechanism indicated at 67 driven by a connection to the engine input shaft 10. A suitable control indicated by block 69 is provided to operate the clutches as a function of the change between actual engine speed and desired engine speed in a manner to be described.

Shaft 66 has a flange 68 fixed to the impeller member 70 of a fluid coupling device 72. This device is of a known type, and has a rotatable turbine member 74 connected to a power output shaft 76. The coupling is of the constantly filled type, and permits a start-up of the transmission from a state of rest without the need for a clutch between the engine and transmission. It is to be noted, however, that a selectively controllable or fill-and-empty type fluid coupling could be used, if desired for this purpose, and also to provide a positive neutral condition of operation, if desired.

The forward end of shaft 66 is adapted to be connected at times to engine shaft 10 by a selectively operable clutch 78. This clutch may be of a known fluid pressure actuated, spring released type. It has driving friction discs 80 splined to engine driven shell 12 and overlapping a friction disc 82 splined to the end of shaft 66. This clutch is normally spring disengaged during all normal forward driving operations, and engaged only to provide a reverse drive, in a manner to be described later.

As stated previously, one of the objects of the invention is to provide a friction drive transmission that will permit the engine to operate substantially at all times at maximum torque and, therefore, substantially at peak efficiency. The control 69 conditions the transmission for this operation. The maximum operating efficiency of an engine generally occurs close to the point of maximum torque on a plotted curve of torque versus speed. As a result, control 69 would be constructed to maintain the engine speed substantially at all times at a point near the peak of the torque curve shown in FIGURE 2. It does this by sensing the actual speed of the engine by receiving a signal from governor 67. If this speed is higher or lower than that which will provide the maximum torque, as best seen in FIGURE 2, the control will slip one or the other of clutches 90 or 92 to axially adjust the inner ball race portions 32 and 34 and the drive ratio of the ball friction device so that the engine is unloaded or loaded, as the case may be, sufficiently to return the engine speed to the desired value. This will become clearer upon a description of the operation of the transmission.

It should be noted, however, that suitable override control means would be incorporated in control 69 to render it inoperable under certain conditions, such as during wide-open throttle operation. At this time, the driver would prefer to have the engine operate at maximum horsepower for fast acceleration of a vehicle from rest or from a lower speed. Since maximum horsepower occurs at point 88 in FIGURE 2, which is at a much higher speed than the point of maximum torque, if the control were allowed to prevail at this point, maximum horsepower and acceleration could not be attained. The override of control 69 is, therefore, operable at this time. The override could consist simply of a switch actuated by the accelerator pedal when it is in its fully depressed position.

The over-all operation will now be described. Assume the vehicle is at rest and the engine idling. Clutch 92 would be completely released and clutch 90 fully engaged. As a result, the tangential reaction torque on inner race portion 32 due to the load on output shaft 76 is now removed. The left-hand inner race portion 32, by its threaded connection to race portion 34, will, therefore, be rotated by balls 20 ahead of race portion 34, causing the two inner race portions to be moved toward one another to increase the clamping forces and the drive ratio by squeezing balls 20 upwardly. This separates outer race portions 28 and 30, which is permitted by movement of race portion 28 against the loading force, and causes balls 20 to contact at points 80, 82 on the outer and inner races. This provides a maximum reduction drive through the ball drive. That is, the point of contact 80 of balls 20 with the outer race 14 is a greater distance from the axis 35 of balls 20 than the point of contact 82 with the inner race 18, thereby reducing the peripheral velocity at the inner points of contact by a maximum amount.

At engine idle, therefore, clockwise rotation of input shaft 10 in the direction of arrow 84 drives outer race 14 and balls 20 in the same direction to drive inner race 18 in the opposite direction. At engine idle, this rotation of the inner race would be absorbed by the fluid coupling 72. That is, at low speeds, the load on output shaft 76 resists rotation of turbine 74; however, the fluid connection between the pump and turbine permits a rotation of the impeller member 70 without rotating turbine 74. Creeping is thus avoided.

Assume now that the vehicle accelerator pedal is depressed to obtain more input shaft torque to accelerate the vehicle. As best seen on the torque versus speed curve of FIGURE 2, if the engine is to operate at maximum torque, which provides the best operating efficiency, the engine speed must be such that the torque and speed plot will fall on the curve within the range indicated at 86. Partial depression of the accelerator pedal would set control 69 for a desired engine speed of, say, 2000 r.p.m. If the pedal were depressed more, the speed signal would call for, say 3000 r.p.m. for example. That is, FIGURE 2 shows that for maximum torque, the speed of input shaft 10 should be a predetermined amount if the engine is to operate efficiently at this time. Since the rear wheels and output shaft 76 are stationary, however, the reaction torque from the load on output shaft 76, acting back through the ball drive 16 to input shaft 10 is high enough so that it will not permit the engine shaft 10 to rotate at the particular speed, 2000–3000 r.p.m., called for. The ball drive ratio, therefore, must be changed to reduce the input shaft load.

The drive ratio is changed by slipping clutch 92 until the ratio of drive unit 16 is increased enough to reduce the load on the input shaft and thereby allow the engine drive shaft 10 to speed up to the desired value. Of course, at start-up of the vehicle, the ball drive ratio will be at a maximum reduction, and clutch 92 will be completely disengaged. Control 69, therefore, having been set according to the throttle setting so far as the desired engine speed is concerned, and knowing the actual speed from governor 67, adjusts the fluid pressure to clutches 90 and 92 to slip whichever clutch is necessary to vary the ball drive ratio to a value that will unload the engine and permit it to speed up to the throttle setting.

The acceleration of engine input shaft 10 then rotates outer race 14 and balls 20 in the same direction about stationary carrier 24, to rotate inner race 18 in the opposite direction. The clutch 90 being engaged causes output shaft 76 to rotate. As the output shaft speeds up, the load on it decreases. This decreases the load on the input shaft, and it speeds up. The governor 67 passes this speed signal to control 69. The control now reduces the drive ratio by engaging clutch 92 and slipping clutch 90 to put more load on the input shaft to thereby reduce the engine speed to the setting originally called for. The relative rotation now permitted between the left and right hand inner race portions 32 and 34 thereby spreads the inner race portions 32 and 34 apart, permitting balls 20 to drop slightly, and, therefore, decrease the drive ratio through the ball drive. This puts a greater load on engine shaft 10 and decreases its speed.

The amount that the clutches 90 and 92 slip, and, therefore, the amount that the drive ratio either increases or decreases, will, of course, depend upon the throttle pedal setting. In other words, the clutches will be continuously slipped relative to one another to progressively adjust the drive ratio so that the point of operation falls substantially always on that portion 86 of the curve in FIGURE 2 providing the maximum torque and, therefore, substantially maximum efficiency.

From the foregoing, therefore, it will be seen that the ball drive ratio is initially conditioned for a maximum reduction drive to initially move the vehicle from a standing start up to any particular speed level. Once the load on the output shaft reduces sufficiently to permit control 69 to begin slipping the clutches 90 or 92, the ball drive ratio will be continuously varied so that the engine will thereafter operate at all times at maximum torque and efficiency.

A reverse drive through the transmission is provided by engaging clutch 78 and disengaging both clutches 58 and 60. This provides a drive from input shaft 10 directly to output shaft 76 through fluid coupling 72. The reverse drive, therefore, provides a drive of output shaft 76 in the same direction as input shaft 10 in contrast to rotation of the output shaft 76 in the opposite direction during forward drive.

While the invention has been illustrated in its preferred embodiment in the figures, it will be clear to those skilled in the arts to which the invention pertains that many changes and modifications may be made thereto without departing from the scope of the invention.

I claim:

1. A ball drive transmission comprising, drive and driven annular spaced races each having axially spaced and movable race portions, a radially adjustable rotatable idler ball member between and frictionally engaging said races, said ball member being movable radially upon axial relative movement of the spaced portions of said races to change the drive ratio through said transmission, means clamping said races and ball member together to transmit a drive therebetween, and means operably connected to said driven race for controlling the drive ratio of said transmission, said latter means including means mounting said inner race portions for relative rotation therebetween, and means responsive to a relative rotation between said portions for axially moving one of said portions to effect a change in the drive ratio through said transmission.

2. An infinitely variable speed friction drive transmission comprising, drive and driven annular spaced races each having axially spaced and movable race portions, a radially adjustable rotatable idler member between and frictionally engaging said races, said idler member being movable radially upon axial relative movement of the spaced portions of said races to change the drive ratio through said transmission, means clamping said races and idler member together to transmit a drive therebetween, and means operably connected to said driven race for controlling the drive ratio of said transmission, said latter means including means mounting said inner race portions for relative rotation therebetween, and means responsive to a relative rotation between said portions for axially moving one of said portions to effect a change in the drive ratio through said transmission.

3. A friction drive transmission comprising power input and output shafts, a plurality of rotatable members including radially spaced relative rotatable race members and a radially adjustable rolling member frictionally engaged therebetween, each of said race members having spaced elements mounted for an axial movement therebetween to radially move said rolling member and effect a change in the drive ratio of said transmission, means connecting the elements of one of said races preventing relative rotation therebetween, means connecting one of said members to said input shaft, means clamping said members together for a drive therebetween, and drive control means operably connecting one of said races to said output shaft, said latter means including means threadedly connecting the elements of said one race to provide axial relative movement therebetween upon relative rotation between said elements, said control means including means connected to said one race portion responsive to a predetermined change in speed of said input shaft for effecting said relative axial movement and effecting a change in the drive ratio through said transmission.

4. A friction drive mechanism comprising spaced drive and driven annular race members, a radially adjustable idler element between and frictionally engaging said race members, said race members having axially spaced and movable portions, means connecting the portions of one of said races preventing relative rotation therebetween, means threadedly connecting the portions of the other race member to effect relative axial movement therebetween upon relative rotation therebetween, means for clamping said races and rolling element together for the transmission of a drive therebetween, axial movement between the portions of said races effecting a radial adjustment of said idler element to change the drive ratio of said device, a driven shaft, and selectively slippable coupling means connected to each of the portions of said other race member and to said driven shaft for controlling the said drive ratio, the slipping of one of said coupling means relative to the other effecting a change in the drive ratio.

5. A friction drive mechanism comprising spaced drive and driven annular race members, a radially adjustable idler element between and frictionally engaging said race members, said race members having axially spaced and movable portions, means connecting the portions of one of said races preventing relative rotation therebetween, means threadedly connecting the portions of the other race member to effect relative axial movement therebetween upon relative rotation therebetween, means for clamping said races and rolling element together for the transmission of a drive therebetween, axial movement between the portions of said races effecting a radial adjustment of said idler element to change the drive ratio of said device, a driven shaft, and a selectively slippable clutch connected to each of the portions of said other race member and to said driven shaft for controlling the said drive ratio, the slipping of one of said clutches relative to the other effecting a change in the drive ratio.

6. A friction drive mechanism comprising spaced drive and driven annular ball race members, a radially adjustable idler ball element between and frictionally engaging said race members, said race members having axially spaced and movable portions, means connecting the portions of one of said races preventing relative rotation therebetween, means threadedly connecting the portions of the other race member to effect relative axial movement therebetween upon relative rotation therebetween, means for clamping said races and ball together for the transmission of a drive therebetween, axial movement between the portions of said races effecting a radial adjustment of said ball to change the drive ratio of said device, a driven shaft, and a selectively slippable clutch connected to each of the portions of said other race member and to said driven shaft for controlling the said drive ratio, the slipping of one of said clutches relative to the other effecting a change in the drive ratio.

References Cited by the Examiner

UNITED STATES PATENTS

| | | | |
|---|---|---|---|
| 2,941,422 | 6/1960 | Barish | 74—796 |
| 2,973,671 | 3/1961 | Elkins | 74—796 |
| 3,237,468 | 3/1966 | Schottler | 74—198 |

DAVID J. WILLIAMOWSKY, *Primary Examiner.*

L. H. GERIN, *Assistant Examiner.*